Figures 1, 2, 3:
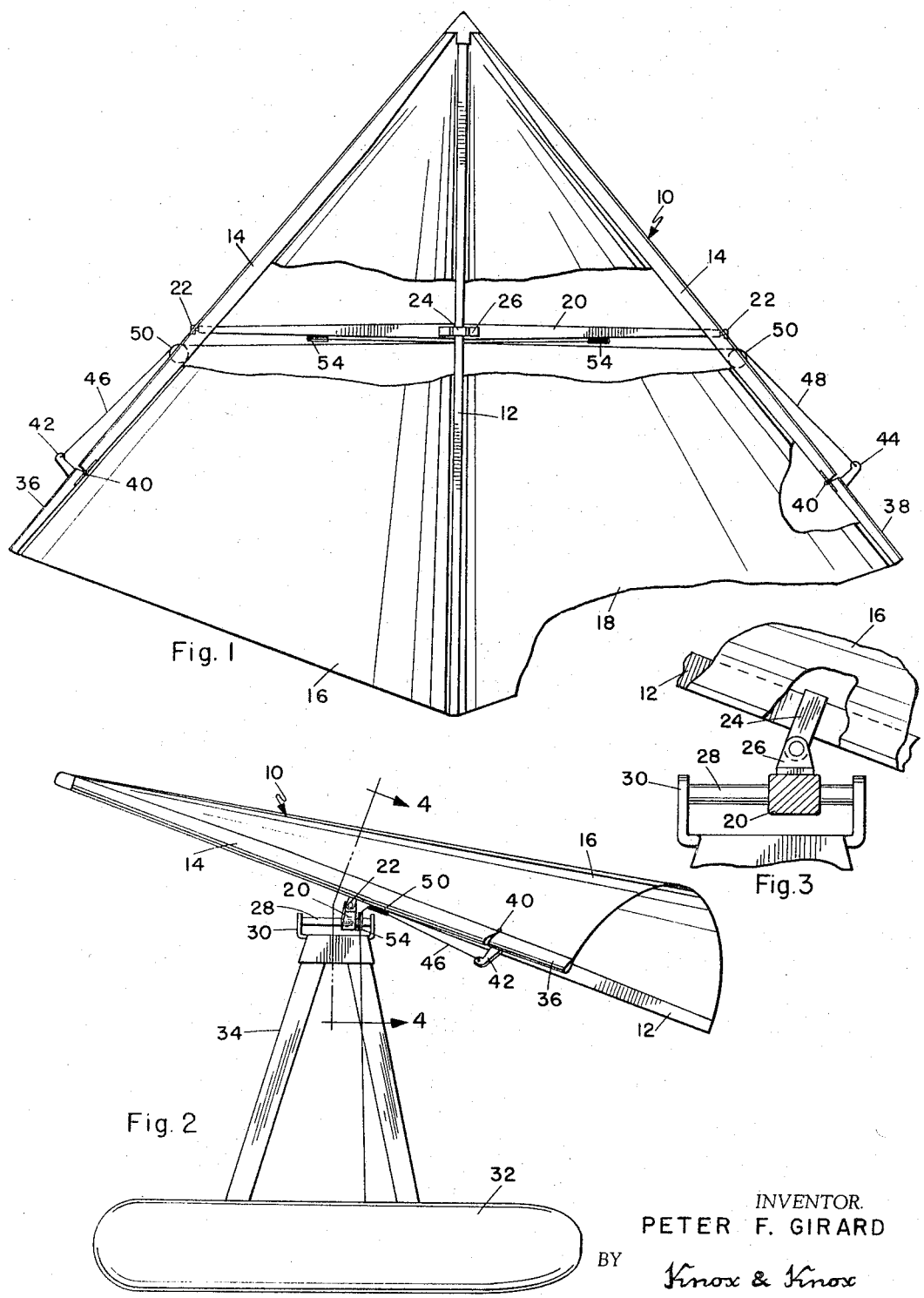

Feb. 28, 1967 P. F. GIRARD 3,306,559
ROLL CONTROL SYSTEM FOR FLEXIBLE WING AIRCRAFT
Filed Nov. 4, 1963 2 Sheets-Sheet 1

INVENTOR.
PETER F. GIRARD
BY
Knox & Knox

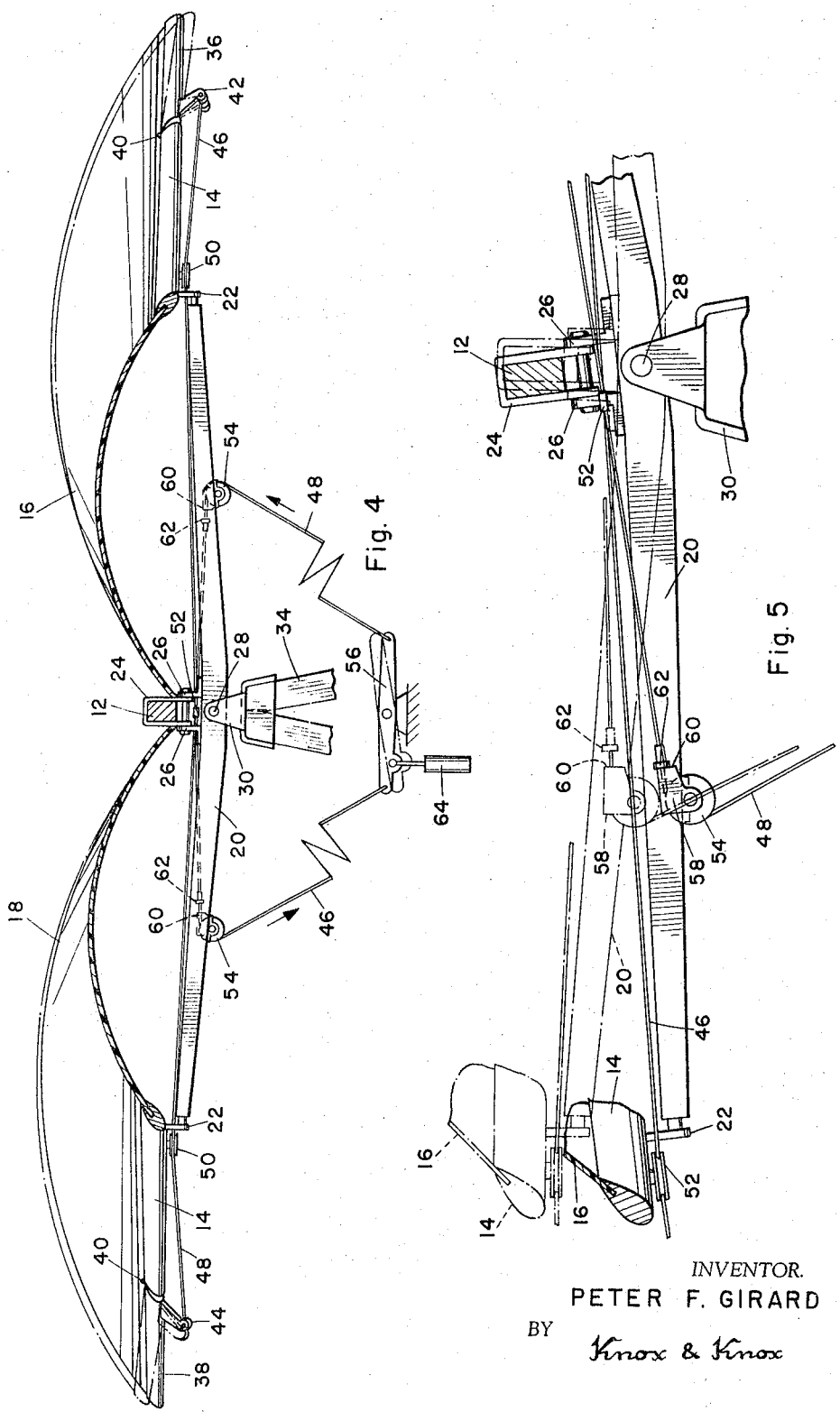

United States Patent Office 3,306,559
Patented Feb. 28, 1967

---

3,306,559
ROLL CONTROL SYSTEM FOR FLEXIBLE WING AIRCRAFT
Peter F. Girard, La Mesa, Calif., assignor to The Ryan Aeronautical Co., San Diego, Calif.
Filed Nov. 4, 1963, Ser. No. 320,995
6 Claims. (Cl. 244—90)

The present invention relates to aircraft and more specifically to a roll control system for flexible wing aircraft.

The flexible wing type aircraft with a payload suspended below the wing is inherently very stable and directional control is usually obtained by shifting the center of gravity of the payload relative to the center of lift of the wing. With the payload pivotally suspended from the wing, the center of gravity is shifted by swinging the payload. Due to the pendulum stability characteristics this results in the wing being tilted, the change in effective lift vector causing the directional change in flight. With heavy payloads the control forces required to provide the control action are considerably more than those required to operate conventional aircraft controls and it is desirable to minimize these forces.

The primary object of this invention, therefore, is to provide a roll control system wherein small portions of the flexible wing are made controllable, causing an aerodynamic unbalance which results in or assists the directional control of the aircraft.

Another object of this invention is to provide a control system wherein the initial control action actuates the small portions of the wing, continued control action causing tilting of the entire wing, using a single mechanism.

Another object of this invention is to provide a control system wherein the wing pivotal axis for roll motion is disposed in such a position that rolling action of the wing does not change the direction of free stream air flow over the wing.

A further object of this invention is to provide a control system which is adapted to a variety of sizes and configurations of flexible wing aircraft, with manual, automatic, or remote control.

In the drawings:
FIGURE 1 is a top plan view of the wing, portions being cut away to show the control system;
FIGURE 2 is a side elevation view of the aircraft;
FIGURE 3 is an enlarged side elevation view of the wing to payload pivotal joint;
FIGURE 4 is an enlarged sectional view taken on line 4—4 of FIGURE 2; and
FIGURE 5 is a further enlarged view of a portion of the control system, as taken from the rear of FIGURE 4.

Similar characters of reference indicate similar or identical elements and portions throughout the specification and throughout the views of the drawing.

General structure

The wing 10 has a rigid longitudinal keel 12, from the forward end of which a pair of leading edge members 14 extend rearwardly on opposite sides and secured between the keel and leading edge members are flexible lifting panels 16 and 18. The leading edge members 14 are held apart in a V form, divergent from the forward end, by a transverse spreader bar 20 passing below the keel 12 and being attached to said leading edge members by hinge brackets 22 having their pivotal axes parallel to the spreader bar. Keel 12 has a yoke 24 which is pivotally attached to brackets 26 on spreader bar 20 to pivot about an axis substantially co-axial with hinge brackets 22.

Fixed to the center of spreader bar 20 is a roll hinge pin 28 extending longitudinally of the aircraft and being journalled in a mounting 30, from which a payload 32 is suspended on a suitable frame 34. The axis of roll hinge pin 28 is substantially parallel to the normal line of flight of the aircraft, or the longitudinal axis thereof, rather than being parallel to keel 12, which is at the high angle of attack peculiar to flexible wing aircraft, as indicated in FIGURES 2 and 3.

Control system

The leading edge members 14 have hinged tip portions 36 and 38 forming the rear ends thereof, the hinges 40 being disposed so that the tip portions swing in planes substantially parallel to the planes of the lifting panels 16 and 18 at their lines of attachment to the hinged portions. In other words the hinge axis of each hinge is perpendicular to the plane of the flexible lifting panel where it is secured to the leading edge member. At the hinged ends of tip portions 36 and 38 are control arms 42 and 44 to which are attached control cables 46 and 48, said control cables passing around pulleys 50 and extending inwardly. Below the keel 12 the control cables 46 and 48 cross and are secured together by a connector 52 for differential action, the cables then continuing to pulleys 54 attached to spreader bar 20 and extending downwardly therefrom to an actuator 56. Pulleys 54 are disposed between the center and ends of spreader bar 20, equally spaced on opposite sides of hinge pin 28. At the pulleys 54 are brackets 58 having stop portions 60 through which control cables 46 and 48 pass, said cables each having a stop collar 62 fixed thereon to engage the respective stop portion and limit movement of the cable.

Actuator 56 is illustrated in FIGURE 4 as a rocker arm with the control cables attached to opposite ends thereof, a jack 64 being coupled to the actuator for rocking motion. The arrangement is similar to that of conventional aircraft ailerons and the control can be manual, or power operated by remote or automatic means, the specific actuating system not being critical.

Operation

In normal flight the wing is stable and maintains a particular flight path. When roll control is applied, as indicated in broken line in FIGURE 4, the actuator 56 pulls one control cable down, in this case the cable 46, and allows the other cable 48 to rise. Since the cables are secured together at their cross over by connector 52, the proper proportion of differential motion is maintained. Control cable 46 pulls on arm 42 causing tip portion 36 to swing outwardly and downwardly, so lowering the profile of trailing edge of the wing panel 16 and effectively increasing its angle of attack, resulting in increased lift on that panel. Simultaneously, the slackening of control cable 48 allows tip portion 38 to swing inwardly and upwardly, pulled by the areodynamic pressure on lifting panel 18. This raises the profile of the trailing edge of panel 18, causing a decrease in effective angle of attack and a corresponding decrease in lift. The offset in lift causes a rolling action to the left, as viewed in FIGURE 4. The axes of hinges 40 are not particularly critical, but the swinging of the tip portions in the planes defined above causes less distortion of the lifting panel shape than a mere lateral or vertical motion of the tips.

Motion of the control cables is, however, limited by the stop collars 62 against stops 60. Thus only the initial motion of the actuator 56 moves the tip portions 36 and 38 in the manner of ailerons to initiate the rolling action. Continued movement of the actuator with the control cable 48 held by stop collar 62, as in FIGURE 5, will result in the spreader bar 20 being tilted about roll hinge pin 28. In FIGURE 5 the offset position is indicated in full line, with the neutral position in broken line. The spreader bar 20 carries the entire wing to the tilted position, the resultant change in total lift vector causing the required roll or turning action.

Without the movable tip portions all roll control would be obtained by moving the entire wing, which would require considerable actuating force. By means of the movable tips, a small actuating force is used to initiate a roll motion, greatly decreasing the total force required. Small roll motions, such as corrective motions in normal flight, can be obtained entirely with the movable tips, without moving the complete wing, the degree of control depending on the range of movement designed into the tip portions. It would be feasible, therefore, to eliminate the roll hinge pin 28 and use the tip portions only for control, depending on the required performance of the aircraft.

As illustrated, however, the roll hinge pin 28 is parallel to the longitudinal axis of the aircraft, or generally parallel to the normal line of flight. If the hinge axis were parallel to the keel 12, inclination of the wing about that axis would change the direction of free stream air flow over the wing. This action would introduce a yaw angle between the wing and relative air flow which, in the flexible wing, results in a rolling moment opposed to the applied roll, so increasing control force. By making the hinge axis parallel to the line of flight, the relative air flow over the wing will be subjected to little if any change at any position of the wing about the roll hinge axis. The control force is thus not increased by yaw effect as the wing is inclined.

The system is particularly suitable for piloted aircraft having manual control, since the physical effort required for control is minimized. In unmanned aircraft the size of the servo mechanisms and their power requirements can be reduced, resulting in an increase in useful payload.

It is understood that minor variation from the form of the invention disclosed herein may be made without departure from the spirit and scope of the invention, and that the specification and drawings are to be considered as merely illustrative rather than limiting.

I claim:

1. In an aircraft:
a wing having a rigid longitudinal keel, leading edge members diverging rearwardly from the forward end of said keel, flexible lifting panels secured to and extending between said keel and said leading edge members, and spreader means secured to and holding said leading edge members in spaced relation;
the rear tip portions of said leading edge members being hinged;
and control means operatively connected to said tip portions to move the same differentially.

2. In an aircraft:
a wing having a rigid longitudinal keel, leading edge members diverging rearwardly from the forward end of said keel, flexible lifting panels secured to and extending between said keel and said leading edge members, and spreader means secured to and holding said leading edge members in spaced relation;
the rear tip portions of said leading edge members being hinged to swing in planes substantially parallel to the respective lifting panels at their attachments to the leading edge members;
and control means operatively connected to said tip portions to swing the same differentially.

3. In an aircraft:
a wing having a rigid longitudinal keel, leading edge members diverging rearwardly from the forward end of said keel, flexible lifting panels secured to and extending between said keel and said leading edge members, and spreader means secured to and holding said leading edge members in spaced relation;
a frame adapted to carry a payload;
said wing being pivotally attached to said frame to swing about an axis substantially parallel to the longitudinal axis of the aircraft with the wing at a positive angle of attack relative thereto;
the rear tip portions of said leading edge members being hinged to swing in planes substantially parallel to the respective lifting panels at their attachments to the leading edge members;
and control means operatively connected to said tip portions to move the same differentially.

4. In an aircraft:
a wing having a rigid longitudinal keel, leading edge members diverging rearwardly from the forward end of said keel, flexible lifting panels secured to and extending between said keel and said leading edge members, and spreader means secured to and holding said leading edge members in spaced relation;
a frame adapted to carry a payload;
said wing being pivotally attached to said frame to swing about an axis substantially parallel to the longitudinal axis of the aircraft with the wing at a positive angle of attack relative thereto;
said leading edge members having integral rear tip portions pivotally attached thereto;
control elements operatively connected to said tip portions to move the same differentially.
stop means on said control elements to limit the movement of said tip portions;
and stops on said wing engageable with said stop means, whereby continued motion of said control elements beyond the stop engaged position causes pivoting of the entire wing relative to said frame.

5. In an aircraft:
a wing having a rigid longitudinal keel, leading edge members diverging rearwardly from the forward end of said keel, flexible lifting panels secured to and extending between said keel and said leading edge members, and spreader means secured to and holding said leading edge members in spaced relation;
a frame adapted to carry a payload;
said wing being pivotally attached to said frame to swing about an axis substantially parallel to the longitudinal axis of the aircraft with the wing at a positive angle of attack relative thereto;
the rear tip portions of said leading edge members being hinged to swing in planes substantially parallel to the respective lifting panels at their attachments to the leading edge members;
control cables connected to said tip portions;
said control cables crossing and being secured together adjacent said keel;
said spreader means comprising a spreader bar with pulleys mounted thereon on opposite sides of said keel;
said cables passing around said pulleys;
and an actuator connected to the ends of said cables for differential movement thereof.

6. In an aircraft;
a wing having a rigid longitudinal keel, leading edge members diverging rearwardly from the forward end of said keel, flexible lifting panels secured to and extending between said keel and said leading edge members, and spreader means secured to and holding said leading edge members in spaced relation;
a frame adapted to carry a payload;
said wing being pivotally attached to said frame to swing about an axis substantially parallel to the longitudinal axis of the aircraft with the wing at a positive angle of attack relative thereto;
said leading edge members having integral rear tip portions pivotally attached thereto;
control cables connected to said tip portions;
said control cables crossing and being secured together adjacent said keel;
said spreader means comprising a spreader bar with pulleys mounted thereon on opposite sides of said keel;
said cables passing around said pulleys;
an actuator connected to the ends of said cables for differential movement thereof;
stops adjacent said pulleys;
and stop means on said cables engageable with said stops to limit movement of said tip portions, whereby movement of said actuator beyond the stop engaged position causes pivotal motion of the entire wing relative to said frame.

References Cited by the Examiner

UNITED STATES PATENTS 3,135,483   6/1964   Girard _____ 244—138 X

OTHER REFERENCES

NASA Technical Note NASA TN D-1946 Full-Scale Wind-Tunnel Investigation of a Flexible-Wing Manned Test Vehicle, by J. L. Johnson, Jr., and J. L. Hassell Jr., pages 5, 15, 16, 29, 21, August 1963.

MILTON BUCHLER, *Primary Examiner.*

FERGUS S. MIDDLETON, *Examiner.*

A. E. CORRIGAN, *Assistant Examiner.*